US009100477B2

(12) United States Patent
Bridges et al.

(10) Patent No.: US 9,100,477 B2
(45) Date of Patent: Aug. 4, 2015

(54) SYSTEM AND METHOD OF CALL SCREENING

(71) Applicant: AT&T Intellectual Property I, L.P., Atlanta, GA (US)

(72) Inventors: J. Bradley Bridges, San Antonio, TX (US); Larry B. Pearson, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/736,707

(22) Filed: Jan. 8, 2013

(65) Prior Publication Data

US 2013/0272507 A1 Oct. 17, 2013

Related U.S. Application Data

(63) Continuation of application No. 10/205,688, filed on Jul. 26, 2002, now Pat. No. 8,374,319.

(51) Int. Cl.
*H04M 1/64* (2006.01)
*H04M 3/436* (2006.01)
*H04M 3/533* (2006.01)

(52) U.S. Cl.
CPC ............ *H04M 3/4365* (2013.01); *H04M 3/436* (2013.01); *H04M 3/533* (2013.01); *H04M 3/53325* (2013.01); *H04M 2203/4563* (2013.01)

(58) Field of Classification Search
USPC .......................................................... 379/70
See application file for complete search history.

(56) References Cited

U.S. PATENT DOCUMENTS 5,367,566 A 11/1994 Moe et al.
5,440,626 A 8/1995 Boyle et al.
(Continued)

FOREIGN PATENT DOCUMENTS

GB 2325597 11/1998
JP 10313325 11/1998
(Continued)

OTHER PUBLICATIONS

Non-Final Office Action for U.S. Appl. No. 10/205,688 received from the United States Patent and Trademark Office (USPTO) mailed Sep. 10, 2003, 28 pages.
(Continued)

*Primary Examiner* — Joseph T Phan
(74) *Attorney, Agent, or Firm* — Toler Law Group, PC

(57) ABSTRACT

A method includes receiving a notification that indicates that a call from a caller has been received at a remote network-based messaging system at a computer terminal. The computer terminal is connected to the remote network-based messaging system via a data connection. The method includes displaying a pop-up view at the computer terminal to notify a subscriber of the call. The pop-up view includes call screening options and an option to add information identifying the caller to an electronic address book that is not a call log. The method includes sending a request to intercept the call from the computer terminal to the remote network-based messaging system via the data connection and sending information that indicates a destination device from the computer terminal to the remote network based messaging system. The call is routed from the remote network-based messaging system to the destination device.

20 Claims, 9 Drawing Sheets

(56) References Cited

U.S. PATENT DOCUMENTS

| | | | |
|---|---|---|---|
| 5,471,519 A * | 11/1995 | Howe et al. | 379/88.26 |
| 5,699,513 A | 12/1997 | Feigen et al. | |
| 5,754,539 A | 5/1998 | Metz et al. | |
| 5,805,587 A * | 9/1998 | Norris et al. | 370/352 |
| 5,809,128 A | 9/1998 | McMullin | |
| 5,946,381 A | 8/1999 | Danne et al. | |
| 5,946,386 A * | 8/1999 | Rogers et al. | 379/265.09 |
| 5,982,774 A | 11/1999 | Foladare et al. | |
| 5,995,603 A | 11/1999 | Anderson | |
| 6,041,103 A * | 3/2000 | La Porta et al. | 379/67.1 |
| 6,078,581 A | 6/2000 | Shtivelman et al. | |
| 6,191,697 B1 | 2/2001 | Hansen et al. | |
| 6,229,878 B1 | 5/2001 | Moganti | |
| 6,285,364 B1 | 9/2001 | Giordano, III et al. | |
| 6,310,939 B1 | 10/2001 | Varney | |
| 6,317,488 B1 | 11/2001 | DePond et al. | |
| 6,366,661 B1 | 4/2002 | Devillier et al. | |
| 6,377,668 B1 | 4/2002 | Smock et al. | |
| 6,404,860 B1 | 6/2002 | Casellini | |
| 6,496,501 B1 | 12/2002 | Rochkind et al. | |
| 7,035,385 B2 * | 4/2006 | Levine et al. | 379/88.23 |
| 7,224,774 B1 | 5/2007 | Brown et al. | |
| 7,245,612 B2 * | 7/2007 | Petty et al. | 370/356 |
| 7,403,768 B2 * | 7/2008 | Bedingfield et al. | 455/414.1 |
| 8,189,747 B1 * | 5/2012 | Meubus et al. | 379/88.17 |
| 8,374,319 B1 | 2/2013 | Bridges et al. | |
| 2002/0010638 A1 | 1/2002 | Fischer | |
| 2002/0041400 A1 | 4/2002 | Hunlich | |
| 2002/0126814 A1 | 9/2002 | Awada et al. | |
| 2002/0126818 A1 | 9/2002 | Cai et al. | |
| 2003/0108172 A1 * | 6/2003 | Petty et al. | 379/142.08 |
| 2003/0152048 A1 | 8/2003 | Soininen et al. | |

FOREIGN PATENT DOCUMENTS

| | | |
|---|---|---|
| WO | WO 98/51063 | 11/1998 |
| WO | 9965194 | 12/1999 |
| WO | 9965194 A1 | 12/1999 |
| WO | 0051155 | 10/2000 |
| WO | WO 00/62266 | 10/2000 |
| WO | WO 01/15397 | 3/2001 |
| WO | 0176210 A1 | 10/2001 |
| WO | 0201906 A1 | 1/2002 |

OTHER PUBLICATIONS

Final Office Action for U.S. Appl. No. 10/205,688 received from the United States Patent and Trademark Office (USPTO) mailed Feb. 26, 2004, 56 pages.
Advisory Action for U.S. Appl. No. 10/205,688 received from the United States Patent and Trademark Office (USPTO) mailed May 26, 2004, 3 pages.
Non-Final Office Action for U.S. Appl. No. 10/205,688 received from the United States Patent and Trademark Office (USPTO) mailed Sep. 8, 2004, 10 pages.
Final Office Action for U.S. Appl. No. 10/205,688 received from the United States Patent and Trademark Office (USPTO) mailed Feb. 8, 2005, 13 pages.
Advisory Action for U.S. Appl. No. 10/205,688 received from the United States Patent and Trademark Office (USPTO) mailed May 4, 2005, 2 pages.
Reply Brief for U.S. Appl. No. 10/205,688 received from the United States Patent and Trademark Office (USPTO) mailed Dec. 15, 2005, 2 pages.
BPAI Decision on Appeal for U.S. Appl. No. 10/205,688 received from the United States Patent and Trademark Office (USPTO) mailed Sep. 29, 2006, 14 pages.
Non-Final Office Action for U.S. Appl. No. 10/205,688 received from the United States Patent and Trademark Office (USPTO) mailed Jan. 11, 2007, 14 pages.
Final Office Action for U.S. Appl. No. 10/205,688 received from the United States Patent and Trademark Office (USPTO) mailed Jun. 20, 2007, 13 pages.
Non-Final Office Action for U.S. Appl. No. 10/205,688 received from the United States Patent and Trademark Office (USPTO) mailed Dec. 31, 2007, 13 pages.
Final Office Action for U.S. Appl. No. 10/205,688 received from the United States Patent and Trademark Office (USPTO) mailed Jun. 18, 2008, 14 pages.
Non-Final Office Action for U.S. Appl. No. 10/205,688 received from the United States Patent and Trademark Office (USPTO) mailed Dec. 10, 2008, 11 pages.
Non-Final Office Action for U.S. Appl. No. 10/205,688 received from the United States Patent and Trademark Office (USPTO) mailed Jun. 9, 2009, 12 pages.
Final Office Action for U.S. Appl. No. 10/205,688 received from the United States Patent and Trademark Office (USPTO) mailed Dec. 29, 2009, 12 pages.
Non-Final Office Action for U.S. Appl. No. 10/205,688 received from the United States Patent and Trademark Office (USPTO) mailed Apr. 1, 2011, 11 pages.
Notice of Allowance for U.S. Appl. No. 10/205,688 received from the United States Patent and Trademark Office (USPTO) mailed Oct. 7, 2011, 12 pages.
Notice of Allowance for U.S. Appl. No. 10/205,688 received from the United States Patent and Trademark Office (USPTO) mailed Oct. 9, 2012, 15 pages.

* cited by examiner

FIG. 4

Unified Communications -- Call Screening

Current Call | Call Log | Addresses | Find

Call Log

| | | | |
|---|---|---|---|
| X 210-555-1212 Elaine Smith | 9:30 AM | Monday | June 3, 2002 |
| X 210-555-1212 John Q. Public | 7:30 AM | Sunday | June 2, 2002 |
| X 210-555-1212 J. Bush | 5:30 PM | Friday | May 31, 2002 |
| X 210-555-1212 Sears-Roebuck | 7:00 PM | Thursday | May 30, 2002 |
| X 210-555-1212 Carpet Care | 6:15 PM | Wednesday | May 29, 2002 |

Current Call

☐ Use this PC
☐ Home Phone
☐ Work Phone
☐ Cellular Phone

Contacts
There are no contacts to display. Click on Contacts to create a new contact.

FIG. 5

SYSTEM AND METHOD OF CALL SCREENING

CLAIM OF PRIORITY

This application is a Continuation Patent Application of, and claims priority from, U.S. patent application Ser. No. 10/205,688, filed on Jul. 26, 2002 and entitled "REALTIME CALL SCREENING," the contents of which is hereby incorporated by reference in its entirety.

FIELD OF THE DISCLOSURE

The present disclosure relates generally to a method and system for use in connection with a network-based messaging system and a remote subscriber terminal.

BACKGROUND

Network-based messaging systems, such as voice-mail systems have been replacing stand-alone answering machines that connect to an individual subscriber telephone. Such network-based messaging systems offer many advantages over stand-alone answering machines, including advanced voice-mail features such as remote message retrieval and user convenience. However, one advantage of the stand-alone answering machines over network-based messaging is that the user can monitor an incoming message in real-time and determine if they want to intercept the message and engage in a conversation with the caller (i.e., call screening). Conventional network-based messaging systems have not offered a call screening feature.

BRIEF DESCRIPTION OF THE DRAWINGS

FIG. 4 is an illustration of a second pop-up display at a subscriber terminal for use during call screening;

FIG. 5 is an illustration of a third pop-up display at a subscriber terminal for use during call interception;

The use of the same reference symbols in different drawings indicates similar or identical items.

DETAILED DESCRIPTION

The present disclosure is generally related to methods for use in connection with network-based messaging systems and related systems.

In accordance with a particular embodiment, the method includes receiving a call at the network-based messaging system and providing a notification to a subscriber of the network-based messaging system that the call has been received and that a message for the subscriber is to be recorded. The subscriber is located remotely from the network-based messaging system.

In accordance with another particular embodiment, the method includes receiving a notification that the call has been received at the remote network-based messaging system and screening the call by monitoring a voice message played at a subscriber terminal while the voice message is being recorded at the remote network-based messaging system.

In accordance with another particular embodiment, the system includes a computer server and a notification module. The computer server is associated with the remote subscriber terminal and includes a voice message storage unit to store voice messages. The notification module is to notify the remote subscriber terminal when a call is received at the computer server and when a voice message is to be recorded.

In accordance with another embodiment, the system includes a gateway responsive to a call destined for a telephone subscriber, a media server responsive to the gateway, an application server associated with a remote subscriber computing device, and a directory server responsive to the media server. The media server includes a voice-mail greeting and voice-mail prompt generator. The application server provides a notification to the remote subscriber computing device in response to a call being received at the media server. The directory server is to identify the application server registered for use by the subscriber.

Figure 1:
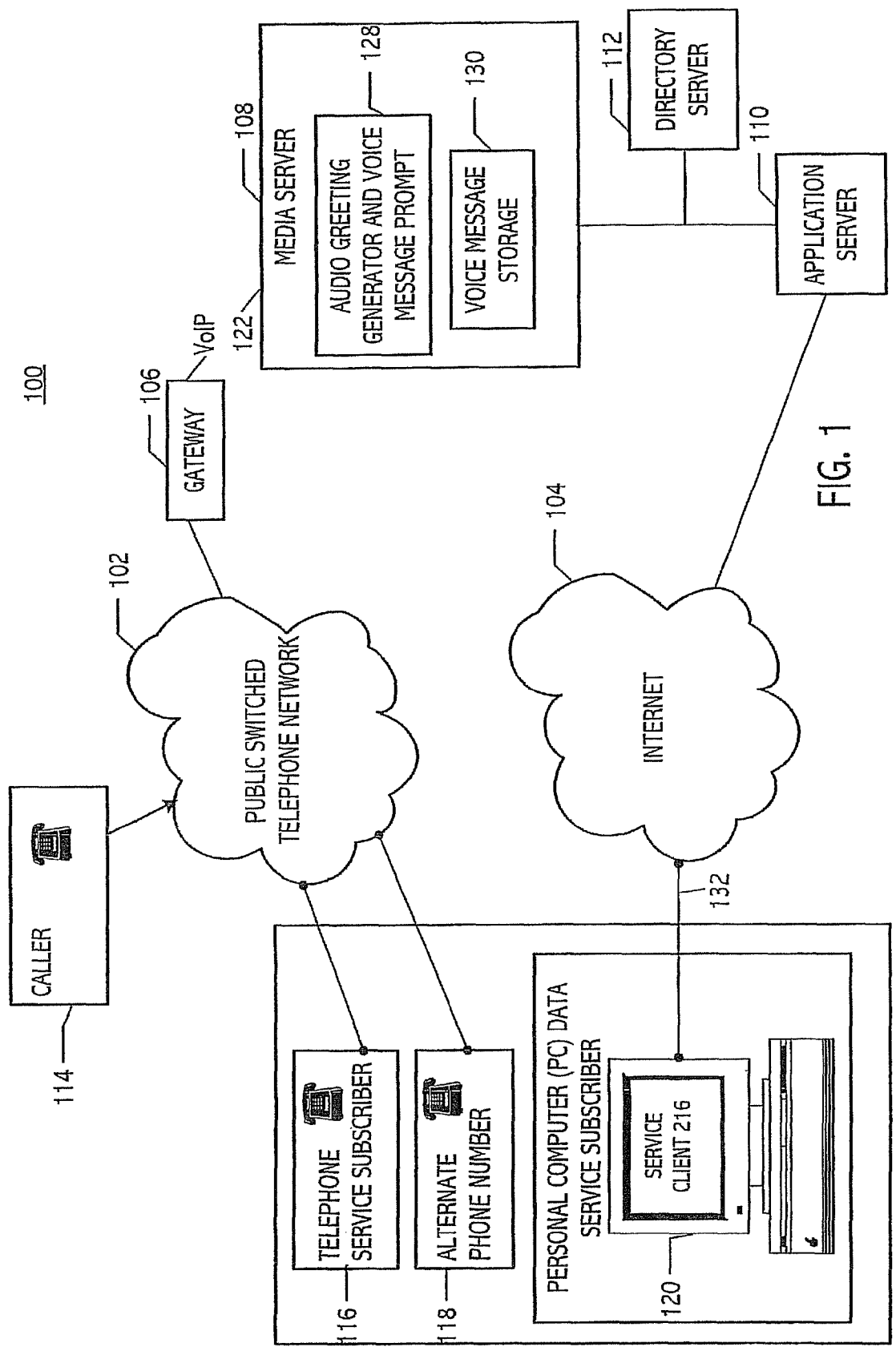
FIG. 1 is a block diagram that illustrates an embodiment of a system that includes a network-based messaging system.

Referring to FIG. 1, a system 100, including a network-based messaging system, is disclosed. The system 100 includes the public switched telephone network (PSTN) 102, the public Internet 104, a voice gateway 106, a media server 108, and an application server 110. The system 100 further includes a directory server 112 accessible by the media server 108, a representative call originator 114, a personal computer used as a subscriber data terminal 120, a telephone subscriber 116, and an alternate phone number for the subscriber 118.

In this particular embodiment, the telephone service subscriber 116 and the alternate phone number 118 are coupled to the PSTN 102. Likewise, the call originator 114 is also coupled to the PSTN 102. The media server 108 is coupled to the voice gateway 106 via a Voice over Internet Protocol connection 122 (VoIP). The media server 108 includes an audio greeting generator and voice message prompt unit 128 and voice message storage 130. The personal computer subscriber terminal 120 includes client service software 216. A subscriber terminal 120 is coupled to the public internet 104 via a conventional connection 132, such as a modem or a high speed data connection.

During operation, a telephone call originated by caller 114 is originally directed towards a telephone destination for the subscriber, such as telephone service subscriber 116. In the event that the telephone subscriber 116 has a busy line, or is otherwise engaged, the call from originator 114 may be directed to the voice gateway 106. In this scenario, the voice gateway 106 converts the phone call from the originating caller 114 to a voice over internet protocol (VoIP) data packet call 122 and directs the call to the media server 108. The media server 108 requests, via the directory server 112, an appropriate application server associated with the destination subscriber 116. Using a look-up function with the directory server 112, the media server 108 determines that the destination subscriber 116 is connected online via subscriber terminal 120 and determines the associated application server 110 to support such subscriber. In this illustrated case, the associated application server to support the subscriber 116 is the application server 110. Although only a single application server is shown, it should be understood that the media server 108 may be coupled to many different application servers that support different subscribers.

After determining the associated application server 110, and upon receipt of the call at media server 108, an audio greeting is produced by audio greeting generator 128 and a voice message prompt such as a "beep" tone that prompts the caller 114 to leave a message. As the message is to be left by the caller 114 and stored within the voice message storage unit 130, the application server 110 sends a notification message via the internet 104 to the subscriber terminal 120. At this point, a notification may be displayed to the subscriber terminal 120, such as via a pop-up screen that lets the subscriber 120 learn of the message that is to be recorded at the network in the voice message storage unit 130. The subscriber at terminal 120 may elect to ignore the recorded message or may elect to screen the message. In the event the caller decides to screen the incoming message, the voice message being recorded at voice message storage unit 130 is also bridged through the application server 110 to the service subscriber terminal 120. At this point, the subscriber terminal 120 may be used to listen to the message being recorded by caller 114 in real time as the message is being recorded and stored at the voice message storage unit 130 within media server 108. This function is referred to as real-time call screening.

In addition, the subscriber terminal 120 may be used to request an intercept action. In this case, the voice message recording function may be interrupted and the original call may be forwarded to an alternate phone number for the subscriber, such as alternate phone number 118. In this particular example, the media server 108 interrupts the voice message recording and the gateway 106 directs call forwarding through the PSTN 102 such that a phone connection is established between caller 114 and the subscriber using alternate phone 118. Although an alternate PSTN phone number is illustrated, the alternate phone may be another communication device used by the subscriber, such as a cellular phone, the personal computer 120, or any other alternative communication device accessible via either the public switched telephone network (PSTN) 102 or the internet 104.

Figure 2:
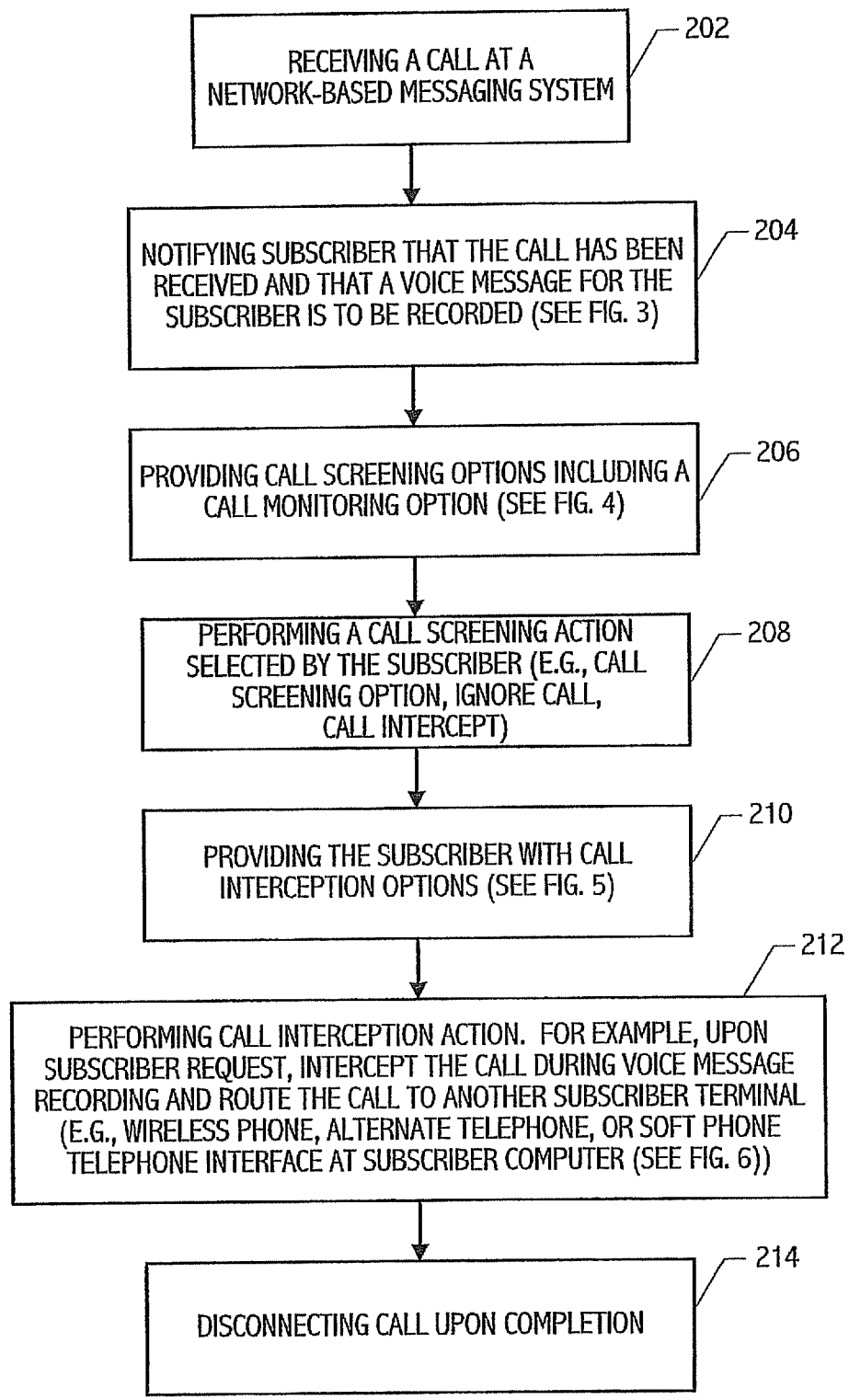
FIG. 2 is a flow chart that illustrates a method for use with a network-based messaging system.
Figure 4:
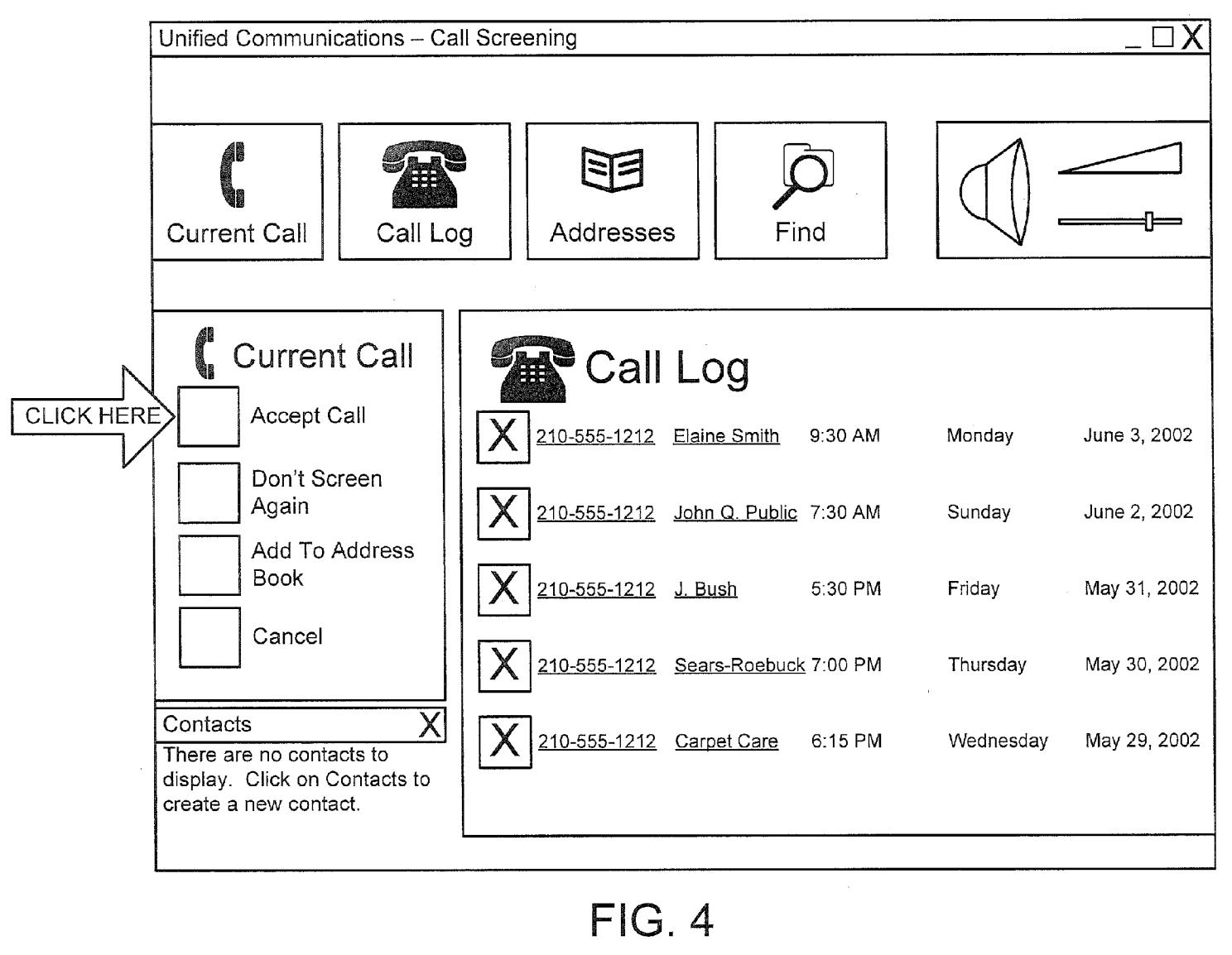

Referring to FIG. 2, a flow chart is provided that illustrates a method of operation of the system 100. A call is received at a network-based messaging system, at step 202. The subscriber is notified that the call has been received and that a voice message for the subscriber is to be recorded, at step 204. An example display to provide such notification to the subscriber is illustrated in the pop-up screen shot of FIG. 3. Call screening options are provided including a call monitoring option, at 206. An example of a call screening option display is shown in FIG. 4. In addition to the call monitoring option, in the example shown in FIG. 4, other options such as ignoring the message, adding the caller to the address book, canceling the call screening option, and interrupting or accepting the call is shown.

Figure 6:
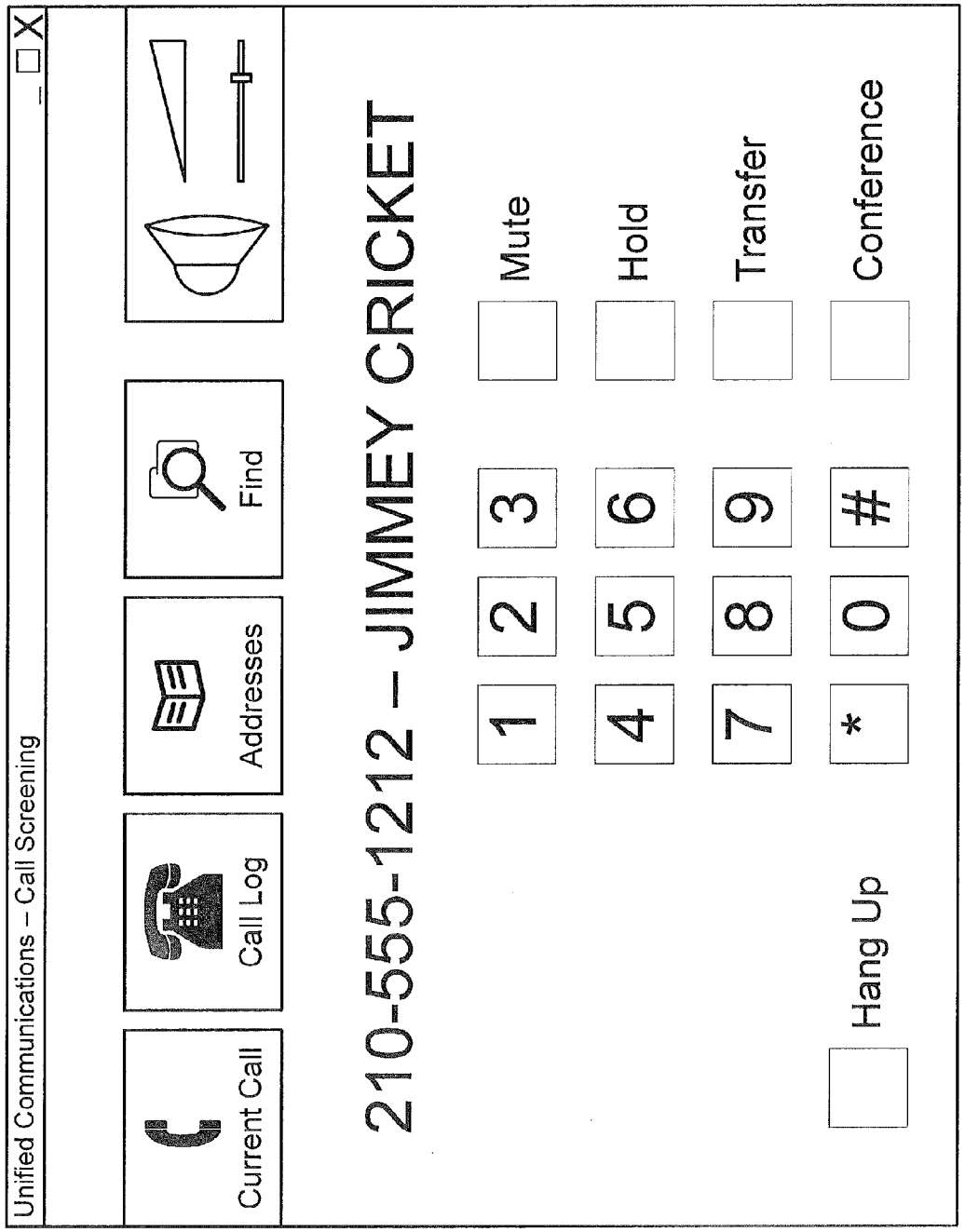
FIG. 6 is an illustration of a fourth pop-up display at a subscriber terminal for use as a soft phone interface.

Upon receipt of the subscriber request, such as when the subscriber selects one of the call screening options from the display menu, a call screening action is performed as selected by the subscriber. Examples of call selection actions are accepting the call, ignoring the call, or performing a call intercept operation, at step 208. The subscriber may then be provided with a call interception option menu, such as the display selection shown in FIG. 5, at step 210. Upon subscriber request, such as receiving a subscriber request in response to the display menu shown in FIG. 5, a call interception action is performed. As an example, based on the subscriber request from the display menu of FIG. 5, the system may intercept the call during voice message recording and then route the call to an alternate subscriber terminal. An example of a suitable alternate subscriber terminal is a wireless phone, an alternate telephone, or a soft phone telephone interface at the subscriber computer, such as the interface illustrated in FIG. 6. The soft phone telephone interface and the pop-up displays of FIG. 3-5 may be provided by client software loaded at the subscriber computer, such as the client software 216. The call interception action is illustrated, at step 212.

After completion of the call, such as completion of the call screening operation, or completion of a live call connection to the alternate phone number, the call may be disconnected, at step 214.

Figure 7:
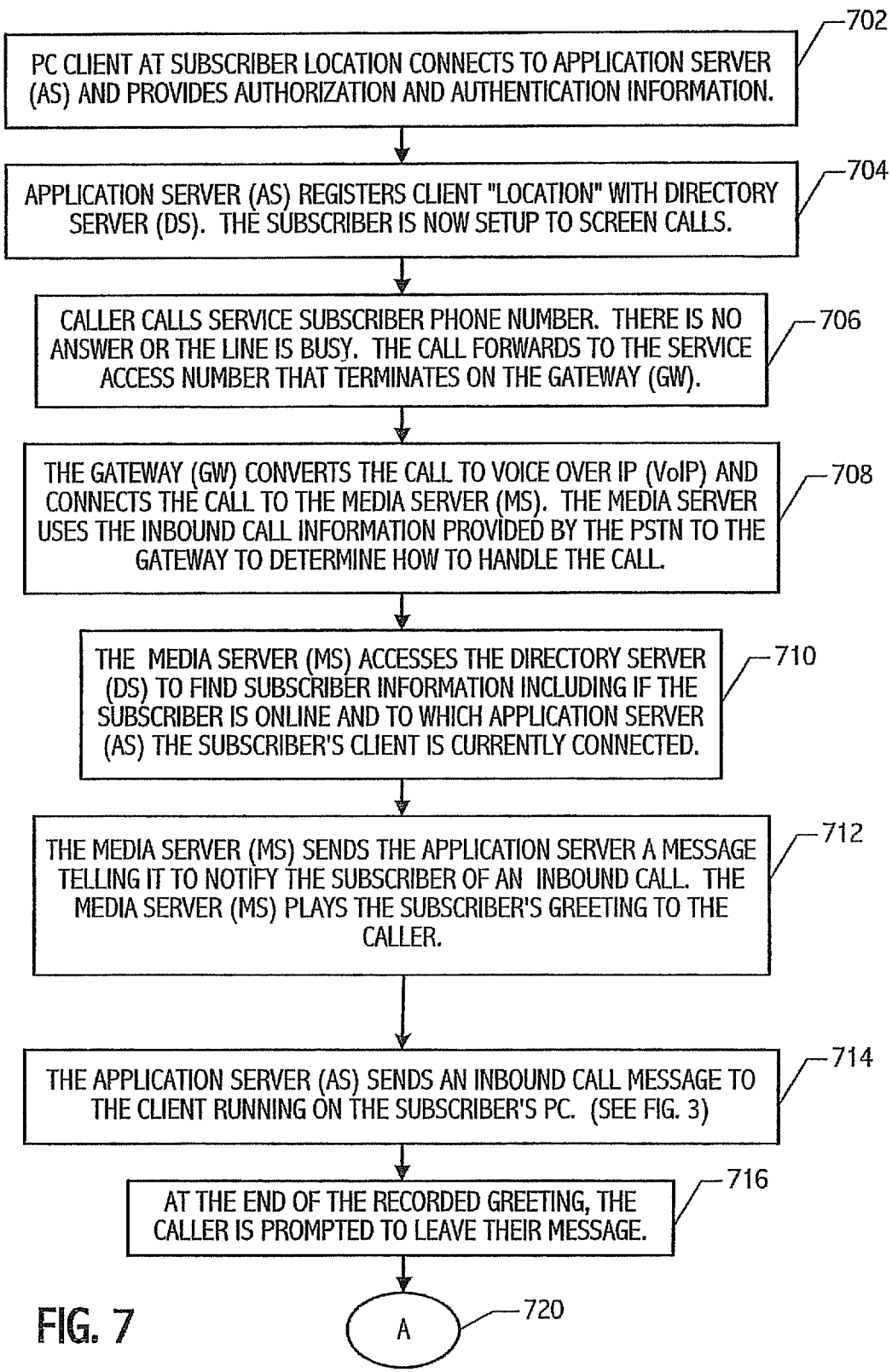
FIGS. 7-9 disclose a flow chart illustrating a more detailed method of using the network-based messaging system of FIG. 1.

Referring to FIG. 7, a more detailed description of the method of operation of the system 100 is illustrated. With this method, the PC client, such as software 216 located within the subscriber computer terminal 120 at the subscriber's location, connects to a remote application server and provides authorization and authentication information, at 702. The application server registers the subscriber client location with the directory server. The subscriber is now set up for call screening operation, at step 704.

A call originator places a call to the subscriber's phone number and there is either no answer or the line is busy. The call is then forwarded to a service access number that terminates on a voice gateway connected to the network-based messaging system, at 706. The gateway converts the call to a voice over internet protocol (VoIP) and connects the call to a media server.

Figure 3:
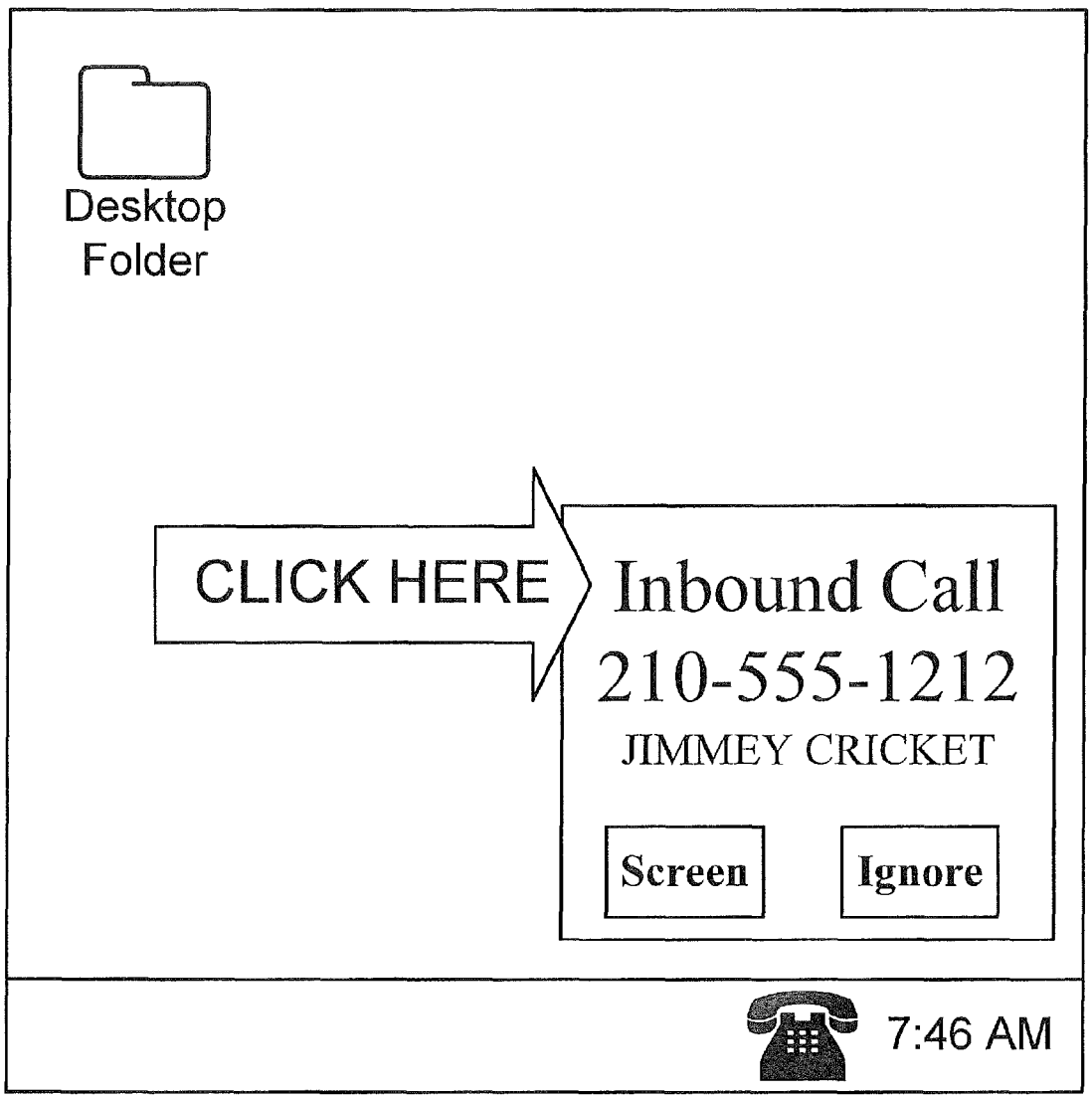
FIG. 3 is an illustration of a first pop-up display at a subscriber terminal after receipt of a call where a message is to be recorded at a network-based server.

The media server uses the inbound call information provided by PSTN to the gateway connection and determines how to handle the call, at step 708. The media server access the directory server to find subscriber information, including whether the subscriber is online and to which particular application server the subscriber client is currently connected, at 710. The media server sends the application server a message telling it to notify the subscriber of an inbound call. The media server plays the subscriber's greeting to the caller, at 712. The application server sends an inbound call message to the client running on the subscriber's PC, at step 714. A particular example of a pop-up display that notifies the PC client user of the inbound call is illustrated at FIG. 3. At the end of the recorded greeting; the caller is prompted to leave their message, at step 716 and processing continues, at 720.

Figure 8:
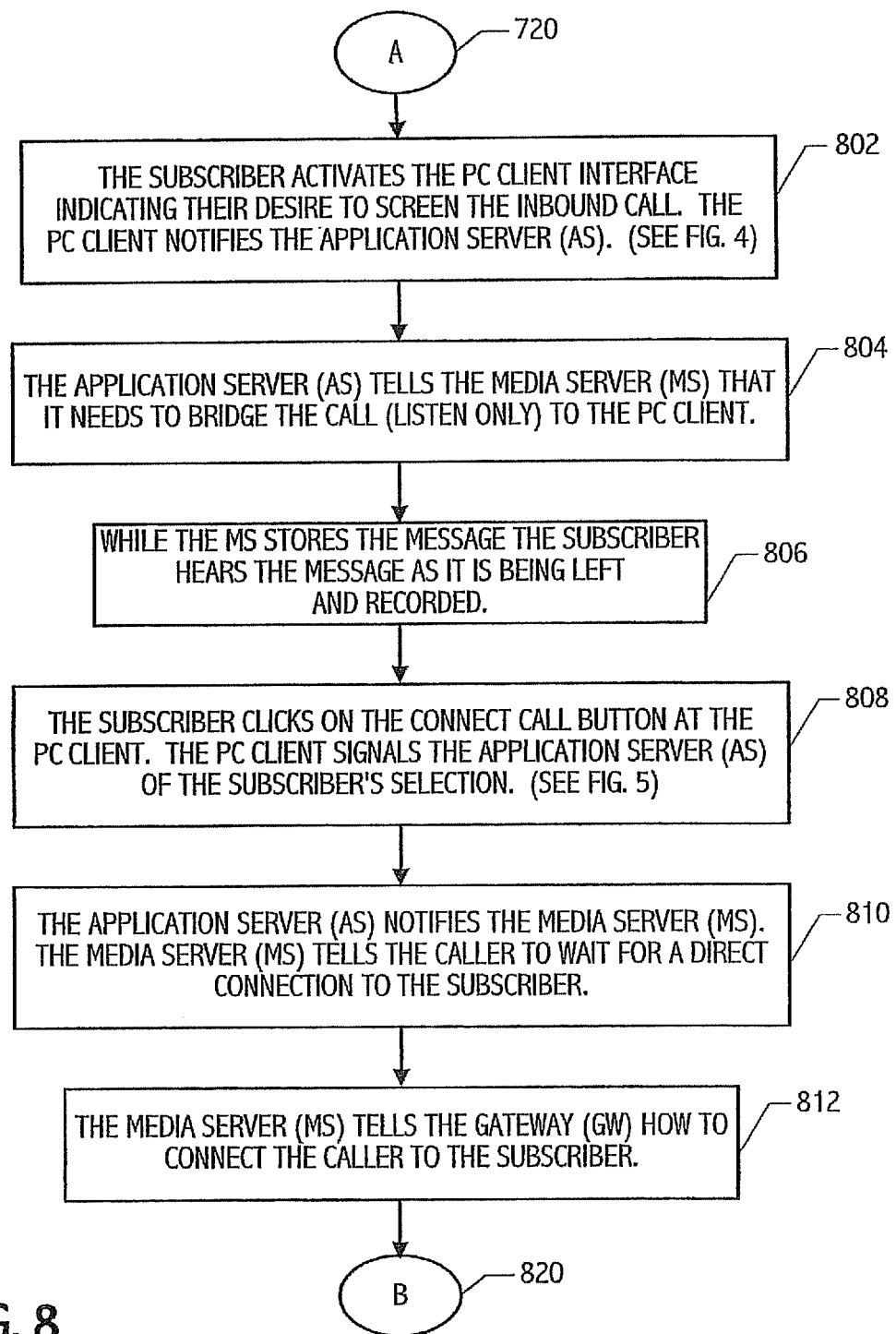

Referring to FIG. 8, the method is continued from step 720 to method step 802 where the subscriber activates the PC client interface indicating a desire to screen the inbound call. The PC client then notifies the application server of the subscriber selection, at step 802 and as illustrated by the second pop-up display at FIG. 4. The application server informs the media server that it needs to bridge the call with a listen only mode to the PC client, at 804. While the media server stores the message, the subscriber hears the message as it's being left and recorded, at 806. The subscriber clicks on the connect call button at the PC client and the PC client signals the application sever of the subscriber selection as illustrated by the third pop-up display shown in FIG. 5, at step 808. The application server notifies the media server and the media server instructs the caller to wait for a direct connection to the subscriber, at step 810. The media server informs the gateway how to connect the caller to the subscriber, at 812 and the process continues at 820.

Figure 9:
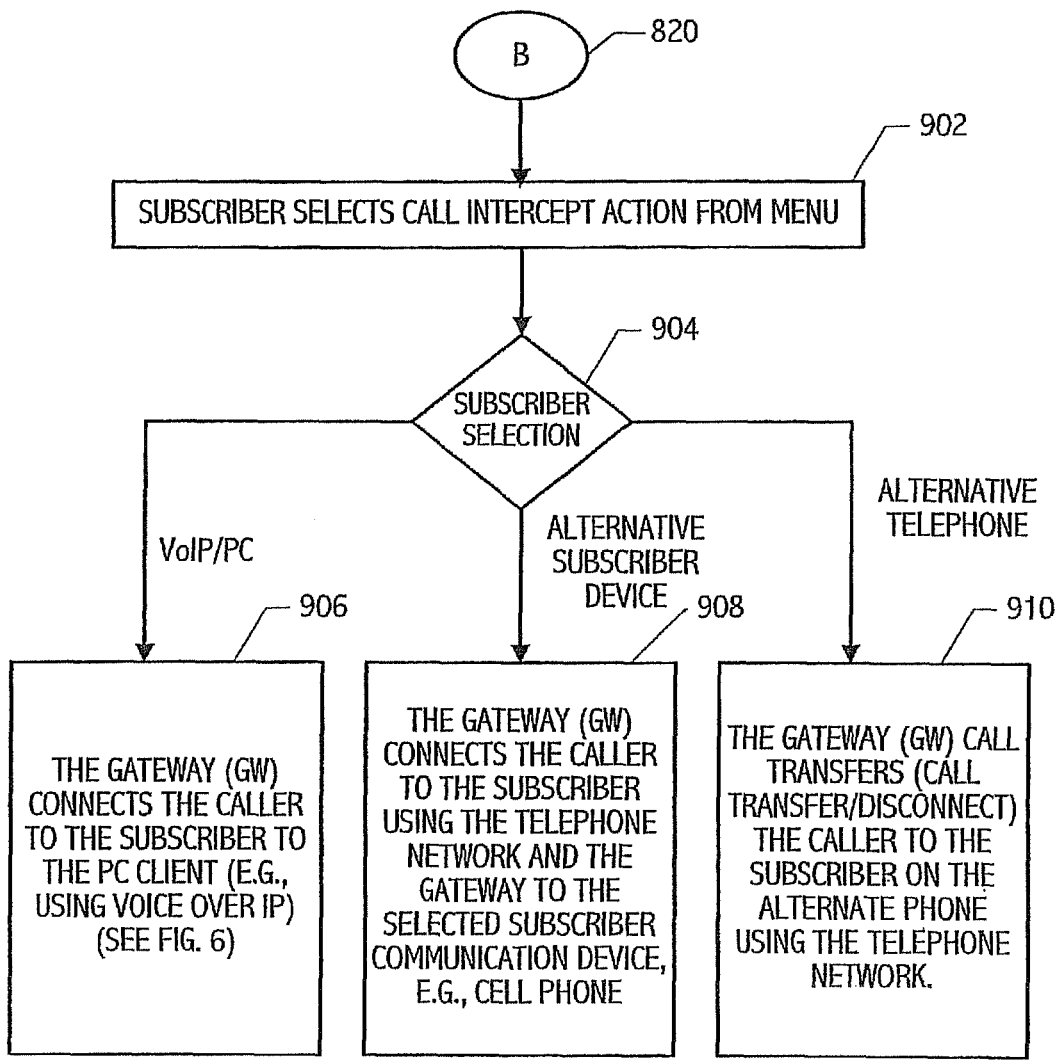

Referring to FIG. 9, processing continues from 820 to step 902 where the subscriber has selected a call intercept action from the display menu such as from the display shown in FIG. 5. Based on the subscriber selection, at decision block 904, processing continues either using a VoIP/PC interface, at 906, routing to an alternative subscriber device, at 908, or to an alternate telephone at 910. Where a VoIP connection is selected, the gateway connects the caller to the subscriber to the PC client, for example using the VoIP channel, at 906. Where an alternative subscriber device is selected, the gateway connects the caller to the subscriber using the telephone network. The alternative subscriber device may be accessed through another network, such as a cellular network coupled to the PSTN, in the case where the selected subscriber device is a wireless phone, at 908. Where the alternative telephone is selected, the gateway call transfers the call to the subscriber on the alternate phone using the telephone network, at 910.

The disclosed real-time call screening capability is provided by a multi tiered service that offers the following advantages to the conventional network-based offering: (1) a pop-up alert message that notifies the on-line user that they are receiving a message to their network based mail box; (2) a pop up alert to provide the user the options of a) ignoring the alert and allowing the recording of the message to continue, and b) monitoring the message as it is being recorded; and (3) electing to intercept the message and, and in essence, pick up the call utilizing either an assigned phone (PSTN, wireless, IF, etc) or a derived voice soft phone via the computer. Thus, the disclosed system and method provide enhanced functionality to network-based voice mail.

What is claimed is:

1. A method comprising:
receiving a call from a caller at a network-based messaging system, wherein the call is directed to a subscriber;
sending a notification of the call to a computer terminal of the subscriber via an application server, wherein the computer terminal is connected to the application server via a data connection, wherein the notification is provided via a pop-up view displayed on the computer terminal, and wherein the pop-up view includes a screen call option;
in response to selection of the screen call option, sending a call screening view to the computer terminal for display during the call, wherein the call screening view is distinct from the pop-up view, and wherein the call screening view includes multiple call screening action options, the call screening action options including:
a call intercept option that enables receiving the call via the application server;
a call forwarding option that enables routing the call to a destination device;
a call log option that enables the subscriber to add information identifying the caller to a call log; and
an electronic address book option that enables the subscriber, during call screening, to add information identifying the caller to an electronic address book that is not a call log;
receiving a selection of a particular call screening action option of the multiple call screening action options; and
handling the call based on the particular call screening action option.

2. The method of claim 1, further comprising determining whether the subscriber is connected to the network-based messaging system by the application server via the data connection, wherein the application server is remote to the subscriber.

3. The method of claim 2, further comprising instructing the caller to wait for a connection to the destination device in response to receiving the selection of the particular call screening action option.

4. The method of claim 2, wherein the application server is configured to register the computer terminal with a directory server to enable call screening.

5. The method of claim 4, wherein determining whether the subscriber is connected to the network-based messaging system occurs at the directory server.

6. The method of claim 1, further comprising, in response to selection of the screen call option, bridging the call to the computer terminal to enable access to a voice-mail message associated with the call as the voice-mail message is being recorded, wherein access to the voice-mail message is in a listen-only mode.

7. A system comprising:
a memory; and
a processor coupled to the memory and configured to:
receive a call directed to a subscriber from a caller;
send a notification of the call to a computer terminal of the subscriber via a data connection, wherein the notification is provided via a pop-up view displayed on the computer terminal, and wherein the pop-up view includes a screen call option;
in response to selection of the screen call option, send a call screening view to the computer terminal for display during the call, wherein the call screening view is distinct from the pop-up view, and wherein the call screening view includes multiple call screening action options, the call screening action options including:
a call intercept option that enables receiving the call via an application server;
a call forwarding option that enables routing the call to a destination device;
a call log option that enables the subscriber to add information identifying the caller to a call log; and
an electronic address book option that enables the subscriber, during call screening, to add information identifying the caller to an electronic address book that is not a call log;
receive a selection of a particular call screening action option; and
handle the call based on the particular call screening action option.

8. The system of claim 7, wherein the processor is further configured to determine whether the subscriber is connected online by the application server that is remote to the subscriber via the data connection.

9. The system of claim 8, wherein the processor is further configured to route the call, via the application server, to destination device associated with the subscriber to handle the call based on a determination that the subscriber is connected online by the application server.

10. The system of claim 9, wherein the processor is further configured to instruct the caller to wait for a connection to the destination device in response to selection of the particular call screening action option.

11. The system of claim 7, wherein notification of the call is sent in response to the subscriber not initially answering the call.

12. The system of claim 7, wherein the processor is further configured to bridge the call to the computer terminal to enable access to a voice-mail message associated with the call as the voice-mail message is being recorded, wherein access to the voice-mail message is in a listen-only mode.

13. A method comprising:
receiving a notification at a computer terminal from a remote network-based messaging system, wherein the computer terminal is connected to the remote network-based messaging system via a data connection, and wherein the notification indicates that a call from a caller has been received at the remote network-based messaging system;

displaying a pop-up view at the computer terminal to notify a subscriber of the call, wherein the pop-up view includes a screen call option;

in response to selection of the screen call option, sending a call screening view to the computer terminal for display during the call, wherein the call screening view is distinct from the pop-up view, and wherein the call screening view includes multiple call screening action options, the call screening action options including:

a call intercept option that enables receiving the call via an application server;

a call forwarding option that enables routing the call to a destination device;

a call log option that enables the subscriber to add information identifying the caller to a call log; and an electronic address book option to, during call screening, add information identifying the caller to an electronic address book that is not a call log;

receiving a selection of a particular call screening action option; and causing the remote network-based messaging system to handle the call based on the particular call screening action option.

14. The method of claim 13, wherein the call screening view is provided while a voice-mail message associated with the call is being recorded.

15. The method of claim 13, further comprising receiving, during call screening, a selection of the destination device and sending information identifying the destination device to the remote network-based messaging system.

16. The method of claim 15, further comprising routing the call to the destination device based on the selection of the destination device.

17. The method of claim 13, wherein the call screening action options further include a screening bypass option to prevent screenings of subsequent calls from the caller.

18. The method of claim 13, further comprising sending a notification to the caller indicating selection of the call intercept option.

19. The method of claim 13, further comprising converting the call to voice over Internet Protocol to enable receiving the call at the application server.

20. The method of claim 15, wherein the destination device is selected from a list of possible display devices configured to receive the call, wherein the list is displayed via the call screening view.

\* \* \* \* \*